(12) United States Patent
Sasaki

(10) Patent No.: US 10,575,514 B1
(45) Date of Patent: *Mar. 3, 2020

(54) INSECT SCREEN ASSEMBLIES

(71) Applicant: Larry Sasaki, Bossier City, LA (US)

(72) Inventor: Larry Sasaki, Bossier City, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,435

(22) Filed: Jul. 9, 2018

Related U.S. Application Data

(63) Continuation-in-part of application No. 15/440,513, filed on Feb. 23, 2017, now Pat. No. 10,018,856.

(51) Int. Cl.
| | |
|---|---|
| *G02C 7/10* | (2006.01) |
| *A01M 29/34* | (2011.01) |
| *G02C 5/00* | (2006.01) |
| *A41D 13/00* | (2006.01) |
| *A41D 13/11* | (2006.01) |
| *G02C 11/00* | (2006.01) |

(52) U.S. Cl.
CPC ........... *A01M 29/34* (2013.01); *A41D 13/001* (2013.01); *A41D 13/1161* (2013.01); *G02C 5/008* (2013.01); *G02C 7/10* (2013.01); *G02C 11/00* (2013.01); *A41D 2400/44* (2013.01); *G02C 2200/02* (2013.01)

(58) Field of Classification Search
CPC ............ G02B 2027/0178; G02C 3/003; G02C 3/006; G02C 11/10; G02C 7/104
USPC ..................... 351/47, 48, 158, 41, 156, 157; 128/206.12, 206.24, 205.27; 2/9, 13
See application file for complete search history.

(56) References Cited

U.S. PATENT DOCUMENTS

| | | | | |
|---|---|---|---|---|
| 1,279,884 | A | 9/1918 | Roche | |
| 2,669,717 | A | 2/1954 | Diggs | |
| 4,821,340 | A | 4/1989 | Johnson | |
| 7,055,521 | B1 * | 6/2006 | Johnson | A62B 18/02 128/200.28 |
| 7,431,453 | B2 | 10/2008 | Hogan | |
| 8,919,951 | B2 | 12/2014 | Steele | |
| 10,018,856 | B1 * | 7/2018 | Sasaki | G02C 9/00 |
| 2015/0346509 | A1 | 12/2015 | Walker | |

* cited by examiner

*Primary Examiner* — Hung X Dang
(74) *Attorney, Agent, or Firm* — R. Keith Harrison

(57) ABSTRACT

Insect screen assemblies for deployment on the head of a wearer and attachment to sunglasses having sunglasses frame arms may include an assembly screen having a plurality of screen openings. A pair of spaced-apart screen attachment devices may include a pair of screen magnets carried by the assembly screen. A pair of sunglasses frame mounts may be configured for attachment to the sunglasses frame arms, respectively, of the sunglasses. A pair of frame mount magnets may be carried by the pair of sunglasses frame mounts, respectively. The pair of screen magnets may magnetically engage the pair of frame mount magnets, respectively, to detachably secure the assembly screen on the sunglasses. At least one panel securing strap may be carried by the assembly screen. The at least one panel securing strap may be extendable around a neck of the wearer. Sunglasses with an insect screen assembly are also disclosed.

20 Claims, 15 Drawing Sheets

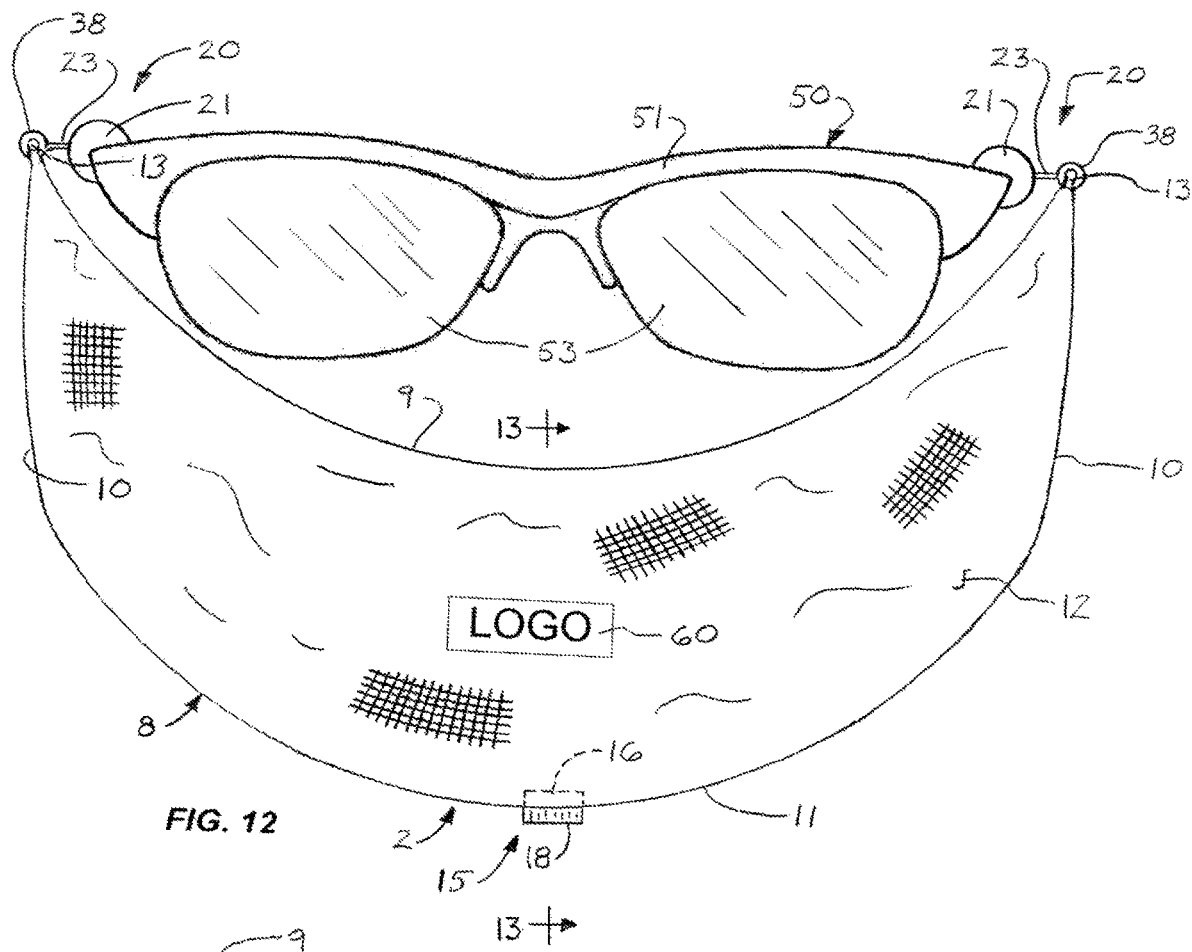
FIG. 12
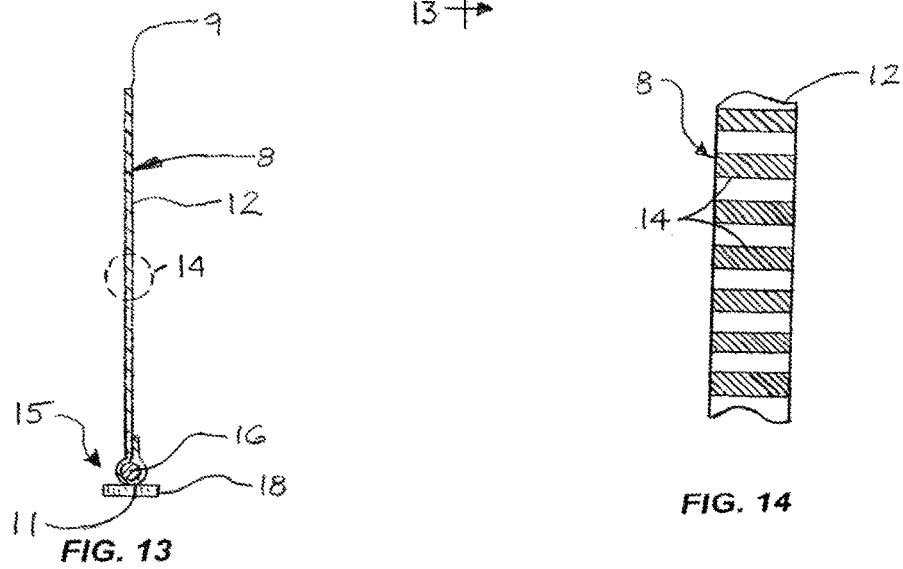
FIG. 13
FIG. 14

INSECT SCREEN ASSEMBLIES

CROSS-REFERENCE TO RELATED APPLICATIONS

This is a continuation-in-part of U.S. application Ser. No. 15/440,513, filed Feb. 23, 2017, now U.S. Pat. No. 10,018,856 and entitled INSECT SCREEN ASSEMBLIES, which application is hereby incorporated by reference herein in its entirety.

FIELD

Illustrative embodiments of the disclosure relate to facial screens which prevent entry of flies or insects into the nose or mouth of a wearer. More particularly, illustrative embodiments of the disclosure relate to insect screen assemblies which can be attached to sunglasses and deployed over the face of a wearer to prevent flies, insects and airborne particles from entering the nose, mouth and ears of the wearer as the wearer rides a bicycle, for example.

SUMMARY

Illustrative embodiments of the disclosure are generally directed to Insect screen assemblies for deployment on the head of a wearer and attachment to sunglasses having sunglasses frame arms may include an assembly screen having a plurality of screen openings. A pair of spaced-apart screen attachment devices may include a pair of screen magnets carried by the assembly screen. A pair of sunglasses frame mounts may be configured for attachment to the sunglasses frame arms, respectively, of the sunglasses. A pair of frame mount magnets may be carried by the pair of sunglasses frame mounts, respectively. The pair of screen magnets may magnetically engage the pair of frame mount magnets, respectively, to detachably secure the assembly screen on the sunglasses. At least one panel securing strap may be carried by the assembly screen. The at least one panel securing strap may be extendable around a neck of the wearer.

Illustrative embodiments of the disclosure are further generally directed to sunglasses with an insect screen assembly. An illustrative embodiment of the sunglasses includes a sunglasses frame, a pair of sunglasses frame arms carried by the sunglasses frame and a pair of sunglasses lenses carried by the sunglasses frame. An assembly screen may have a plurality of screen openings. A pair of spaced-apart screen attachment devices may include a pair of screen magnets carried by the assembly screen. A pair of sunglasses frame mounts may be configured for attachment to the sunglasses frame arms, respectively, of the sunglasses. A pair of frame mount magnets may be carried by the pair of sunglasses frame mounts, respectively. The pair of screen magnets may magnetically engage the pair of frame mount magnets, respectively, to detachably secure the assembly screen on the sunglasses. At least one panel securing strap may be carried by the assembly screen. The at least one panel securing strap may be extendable around a neck of the wearer.

BRIEF DESCRIPTION OF THE DRAWINGS

Illustrative embodiments of the disclosure will now be described, by way of example, with reference to the accompanying drawings, in which:

FIG. 12 is a front view of the illustrative insect screen assembly illustrated in FIG. 11, secured to the sunglasses;

FIG. 13 is a sectional view of a typical assembly screen of the insect screen assembly, taken along section lines 13-13 in FIG. 12;

FIG. 14 is an enlarged sectional view, taken along section line 14 in FIG. 13;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
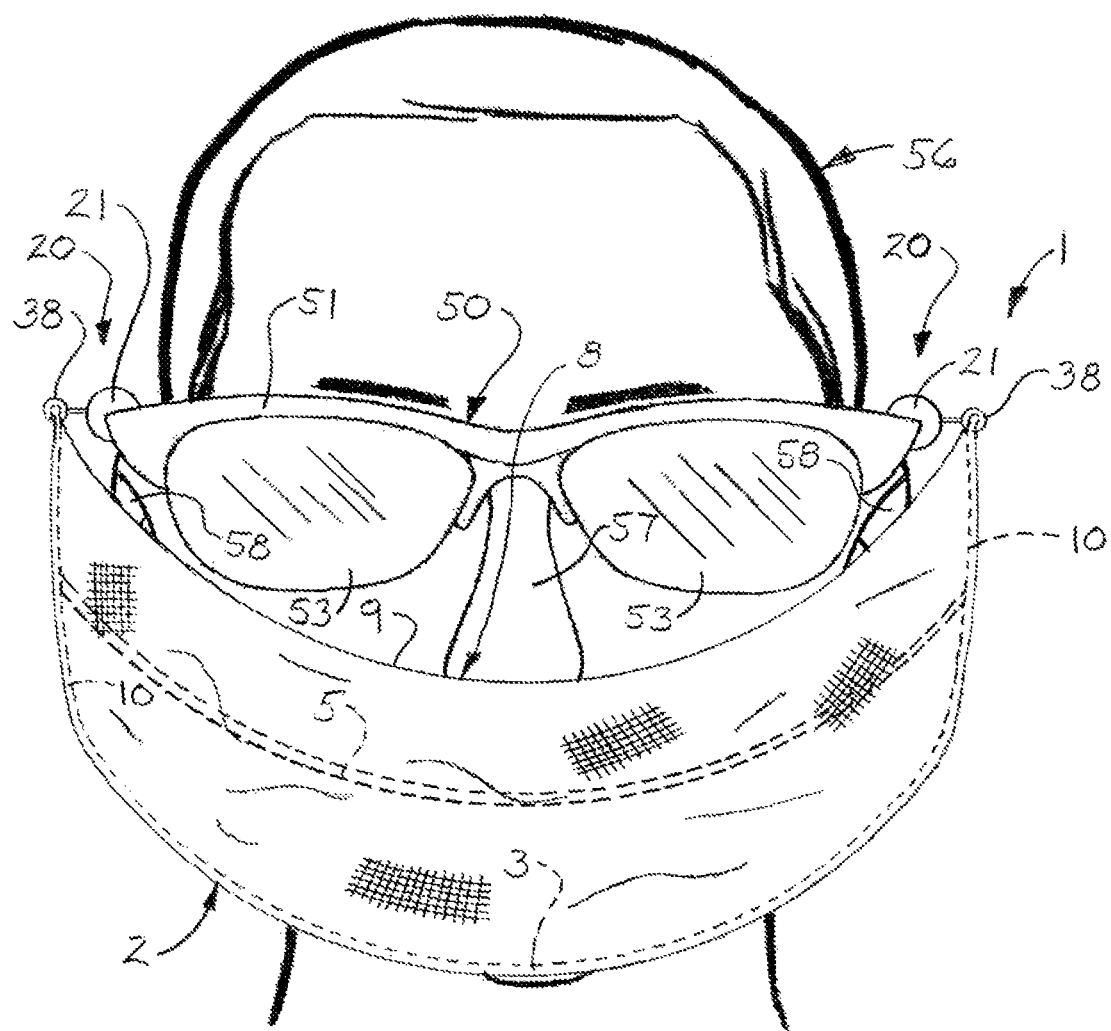
FIG. 9 is a front view of the insect screen assembly secured to the sunglasses and deployed over the nose and mouth of a wearer as the wearer dons the sunglasses.

Referring to the drawings, an illustrative embodiment of the insect screen assemblies is generally indicated by reference numeral 1. As illustrated in FIG. 9, in typical application, which will be hereinafter described, the insect screen assembly 1 may be secured to a pair of sunglasses 50. The sunglasses 50 may be conventional, with a sunglasses frame 51, a pair of sunglasses arms 52 and a pair of sunglasses lenses 53. As a wearer 56 dons the sunglasses 50, the insect screen assembly 1 is deployed over the wearer's face and may substantially cover the nose 57 and mouth (not illustrated) of the wearer 56. The insect screen assembly 1 may additionally cover the ears 58 of the wearer 56. Accordingly, the insect screen assembly 1 may block and prevent flies, insects and airborne particles from entering the nose 57, mouth and ears 58 of the wearer 56, particularly as the wearer 56 rides a bicycle, for example.

Figure 6:
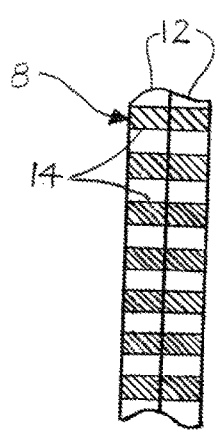
FIG. 6 is an enlarged sectional view, taken along section line 5 in FIG. 5.

The insect screen assembly 1 may include an assembly screen 8. As illustrated in FIG. 6, the assembly screen 8 may include at least one screen panel layer 12 having a plurality of screen openings 14. The assembly screen 8 may include a single screen panel layer 12, or alternatively, multiple laminated or non-laminated screen panel layers 12. In some embodiments, the screen panel layer 12 may have a flexible net or mesh construction and may be fabricated of nylon, polyester and/or other fabric materials which are known by those skilled in the art and suitable for the purpose. In other embodiments, the screen panel layer 12 may have a semi-rigid or rigid plastic or other construction. The screen openings 14 may extend through the screen panel layer 12 in a selected number, spacing and pattern.

Figure 1:
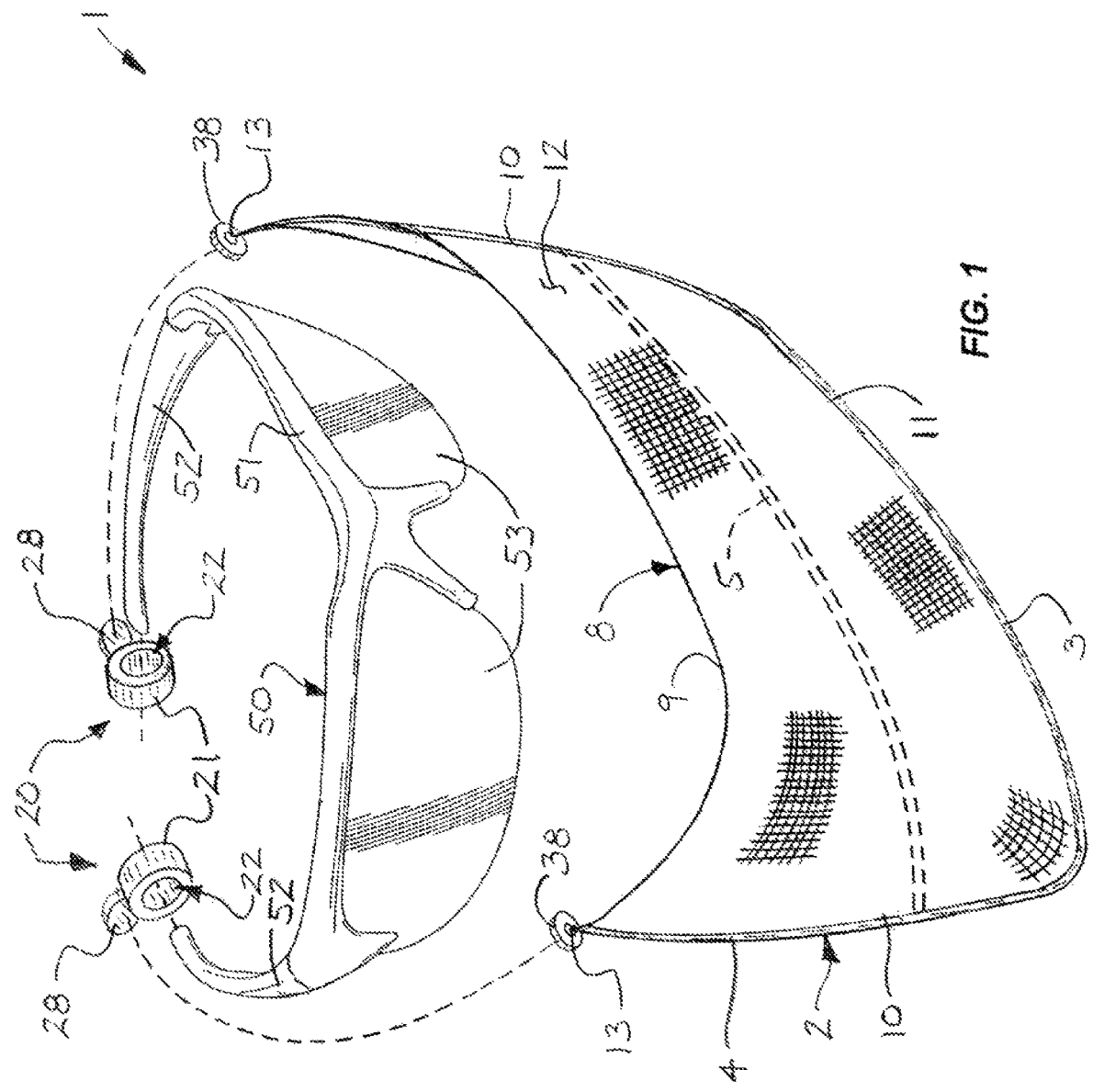
FIG. 1 is an exploded front perspective view of an illustrative embodiment of the insect screen assemblies, more particularly illustrating a typical pair of screen attachment devices for detachably securing the insect screen assemblies on a pair of sunglasses.
Figure 4:
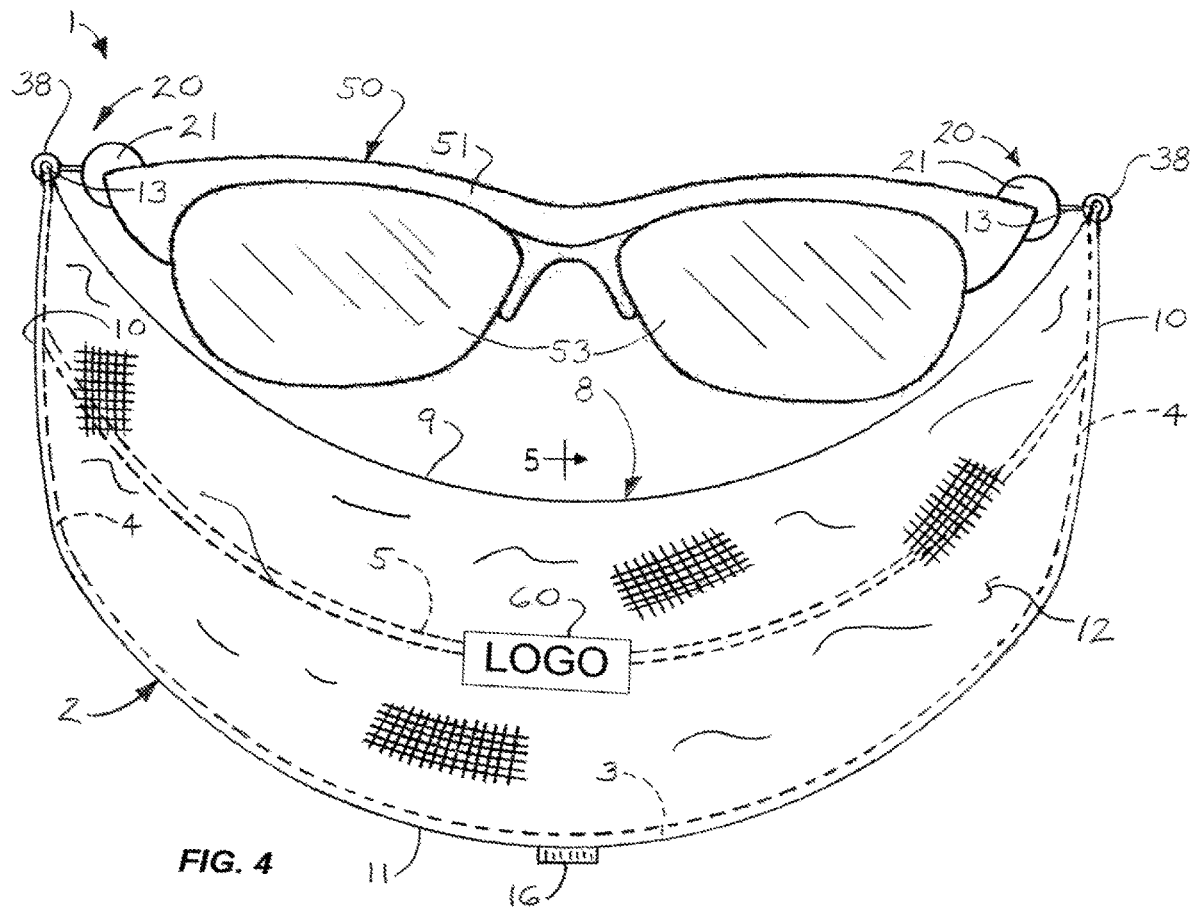
FIG. 4 is a front view of the illustrative insect screen assembly attached to the sunglasses.

As illustrated in FIGS. 1 and 4, the assembly screen 8 may be generally elongated and curved in shape. In some embodiments, the assembly screen 8 may have an upper screen edge 9 which may be generally concave; a pair of spaced-apart side screen edges 10 which may curve downwardly and inwardly toward each other from the upper screen edge 9; and a lower screen edge 11 which may be generally convex. The side screen edges 10 may join the upper screen edge 9 at a pair of upper screen corners 13. In alternative embodiments, the assembly screen 8 may have other shapes. The assembly screen 8 may be suitably sized and configured to substantially cover the nose 57, mouth (not illustrated) and ears 58 of the wearer 56 (FIG. 9) when the insect screen assembly 1 is secured to the sunglasses 50 and the sunglasses 50 are donned by the wearer 56. As illustrated in FIG. 4, in some embodiments, a logo 60 may be printed, stamped and/or otherwise placed on the screen panel layer 12 of the assembly screen 8. The logo 60 may advertise a sports team, school, business or other entity.

Figure 5:
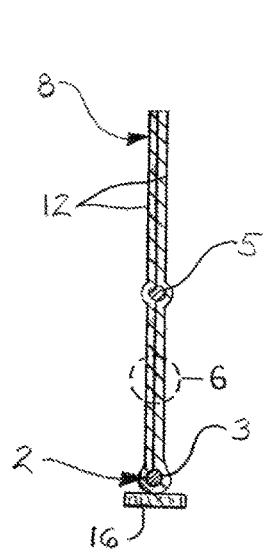
FIG. 5 is a sectional view of a typical assembly screen of the insect screen assembly, taken along section lines 5-5 in FIG. 4.

In some embodiments, the assembly screen 8 may include an assembly frame 2 which supports the screen panel layer or layers 12. Accordingly, as illustrated in FIGS. 1, 4 and 5, the assembly frame 2 may include a generally elongated lower frame member 3 and a pair of spaced-apart side frame members 4 which extend from the lower frame member 3. The screen panel layer 12 may be attached to the lower frame member 3 at the lower screen edge 11 and to the side frame members 4 at the respective side screen edges 10 of the assembly screen 8 according to the knowledge of those skilled in the art. For example and without limitation, in some embodiments, the screen panel layer 12 may be looped around the lower frame member 3 and the respective side frame members 4 and stitched, sewn or otherwise secured to itself to mount the screen panel layer 12 to the assembly frame 2. In other embodiments, the screen panel layer 12 may be attached to the assembly frame 2 using alternative techniques. As illustrated in FIGS. 1 and 5, in some embodiments, at least one middle frame member 5 may span the side frame members 4 of the assembly frame 2.

Figure 10:
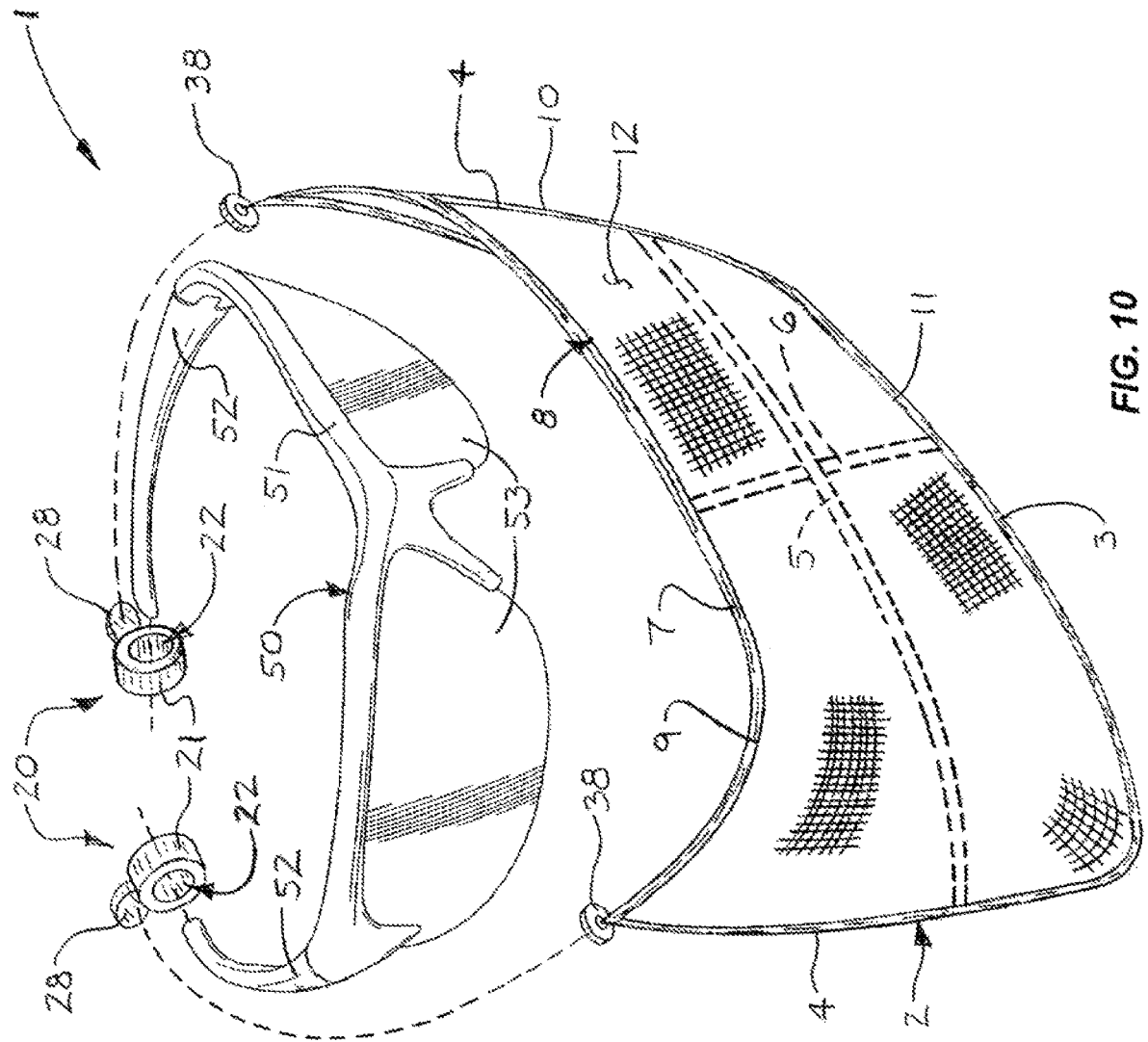
FIG. 10 is an exploded front perspective view of an alternative illustrative embodiment of the insect screen assemblies, detached from the sunglasses.
Figure 11:
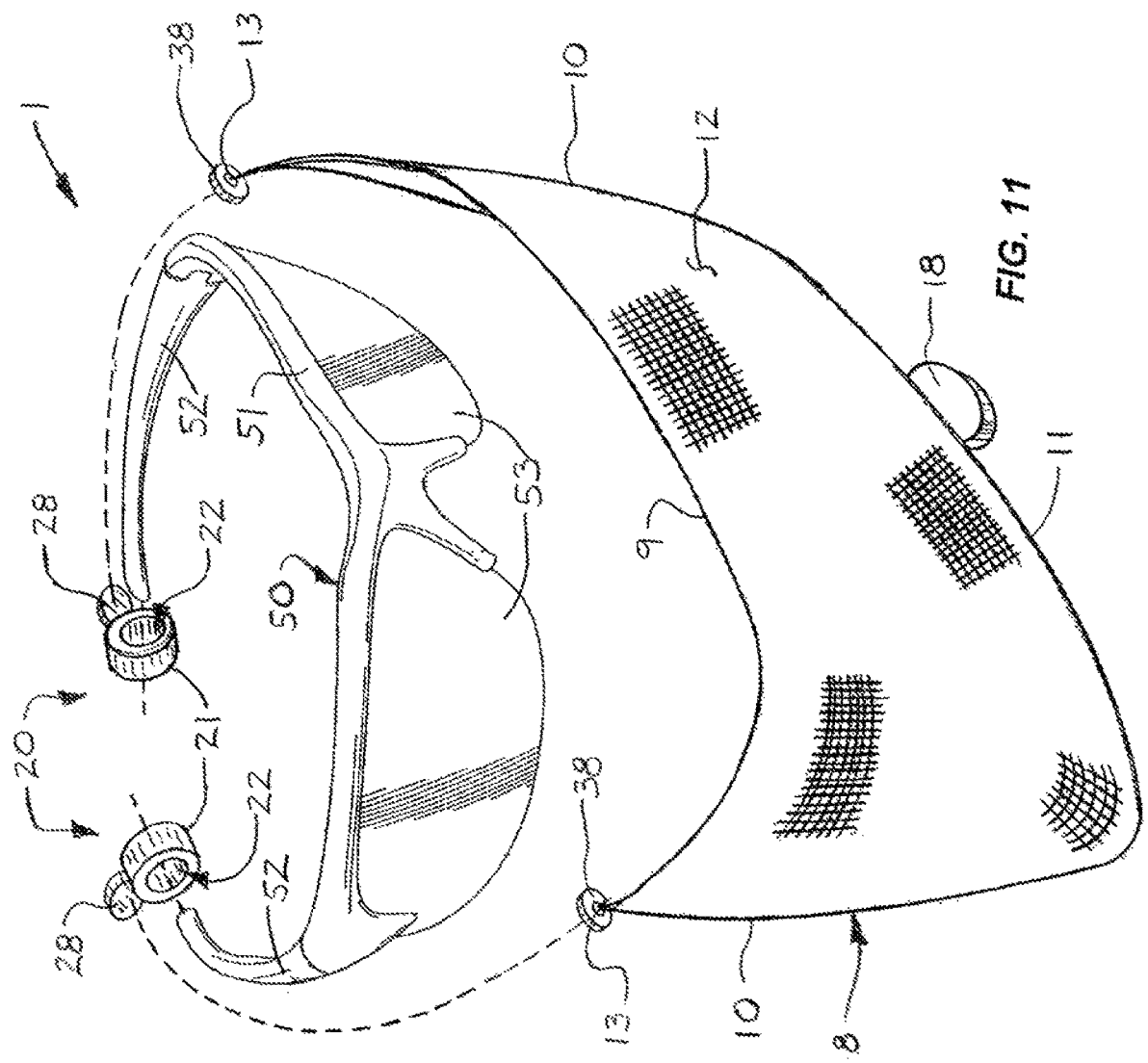
FIG. 11 is an exploded front perspective view of another alternative illustrative embodiment of the insect screen assemblies, detached from the sunglasses.

As illustrated in FIG. 10, in some embodiments, the assembly frame 2 may further include an upper frame member 7 which spans the side frame members 4 in spaced-apart relationship to the lower frame member 3. At least one cross frame member 6 may span the lower frame member 3 and the upper frame member 7 and may intersect the middle frame member 5. Accordingly, the middle frame member 5 and the cross frame member 6 may reinforce and impart structural rigidity to the assembly frame 2 in some embodiments.

As illustrated in FIGS. 11-14 of the drawings, in some embodiments, the assembly frame 2 may be omitted from the assembly screen 8. Accordingly, the assembly screen 8 may include a single screen panel layer 12, as illustrated in FIG. 14. Alternatively, the assembly screen 8 may include multiple, laminated or non-laminated screen panel layers 12, as was heretofore described with respect to FIGS. 5 and 6. As illustrated in FIGS. 12 and 13, in some embodiments, the assembly screen 8 may include a screen weight assembly IS which maintains the assembly screen 8 deployed in place over the face of the wearer 56 (FIG. 9) by gravity in use of the insect screen assembly 1, as will be hereinafter described. The screen weight assembly 15 may include at least one screen magnet 16 which may be secured in the lower screen edge 11 of the assembly screen 8 according to the knowledge of those skilled in the art. For example and without limitation, in some embodiments, the screen panel layer 12 may be looped around the screen magnet 16 at the lower screen edge 11 and stitched, sewn or otherwise attached to itself on the opposite side, as illustrated in FIG. 13. At least one magnetic screen weight 18 may be magnetically attached to the screen magnet 16. In some embodiments, one or more additional magnetic screen weights 18 may be magnetically attached to each other to impart the desired weight to the assembly screen 8 to maintain deployment of the assembly screen 8 over the nose 57 and mouth of the wearer 56, as illustrated in FIG. 9.

Figure 2:
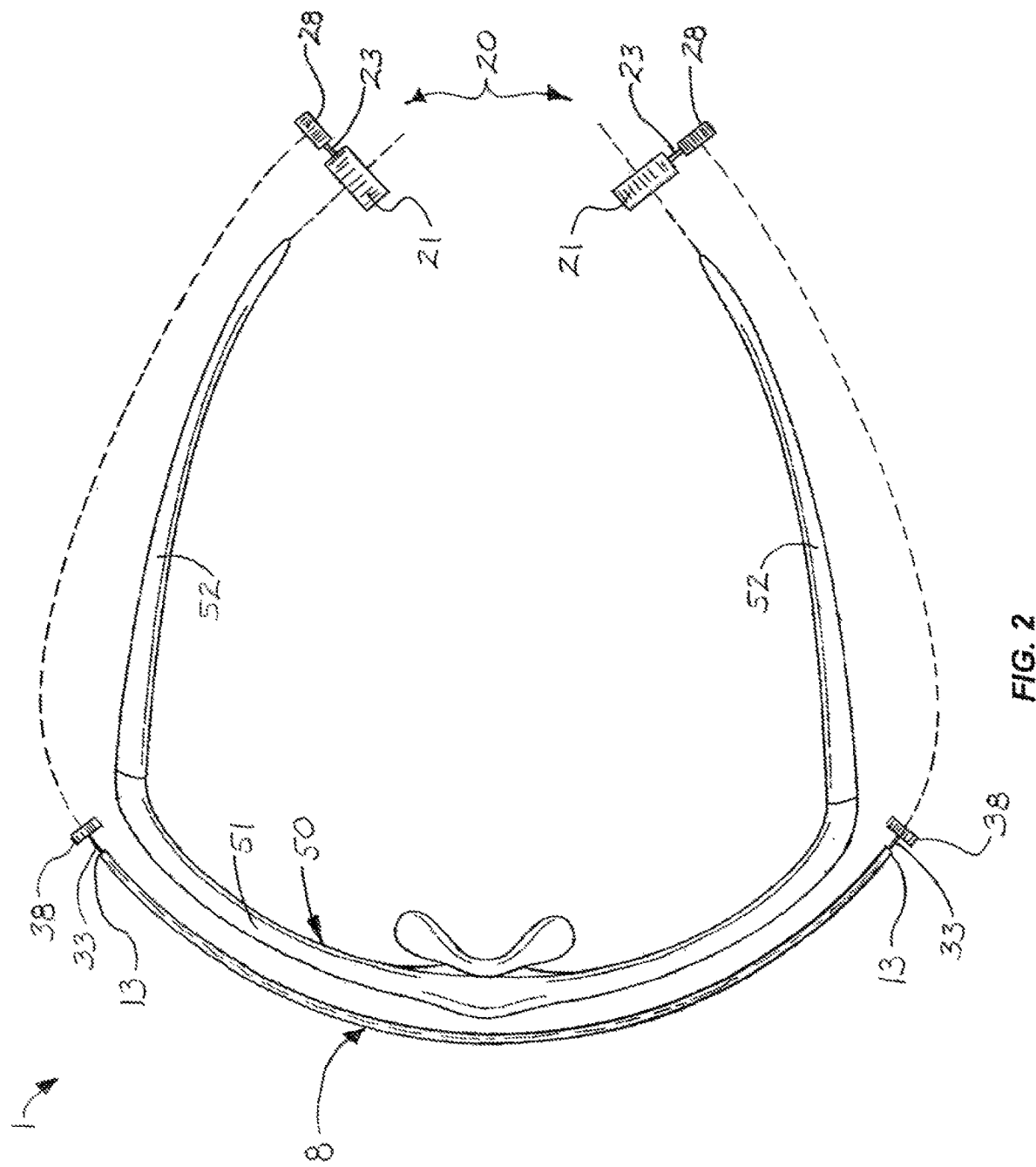
FIG. 2 is an exploded top view of the illustrative insect screen assembly detached from the sunglasses.
Figure 3:
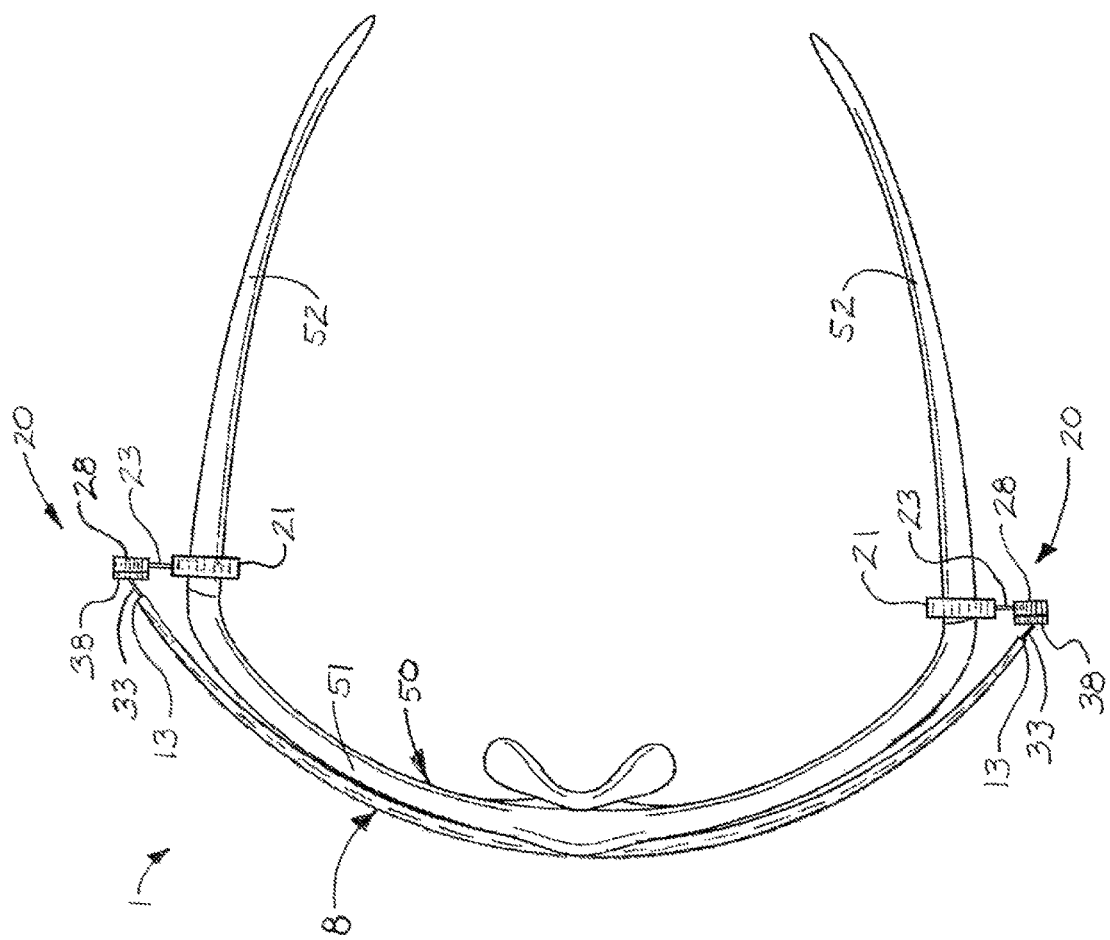
FIG. 3 is a top view of the illustrative insect screen assembly secured to the sunglasses.

As illustrated in FIGS. 1-3, a pair of screen attachment devices 20 may detachably attach the assembly screen 8 to the sunglasses 50. The screen attachment devices 20 may include a pair of sunglasses frame mounts 21. The sunglasses frame mounts 21 may be detachably attached to the respective sunglasses frame arms 52 of the sunglasses frame 51 according to the knowledge of those skilled in the art, as will be hereinafter described. A pair of frame mount magnets 28 may extend from the respective sunglasses frame mounts 21. A pair of screen magnets 38 may be provided on the assembly screen 8. As illustrated in FIGS. 1 and 4, in some embodiments, the screen magnets 38 may be provided at the respective upper screen corners 13 of the assembly screen 8. The screen magnets 38 may be attached to the screen panel layer 12 or to the assembly frame 2 according to the knowledge of those skilled in the art. Accordingly, the screen magnets 38 on the assembly screen 8 may magnetically engage the respective frame mount magnets 28 on the sunglasses frame mounts 21 to detachably secure the assembly screen 8 to the sunglasses frame mounts 21.

The sunglasses frame mounts 21 may be attached to the respective sunglasses frame arms 52 of the sunglasses 50 according to any suitable technique which is known by those skilled in the art. For example and without limitation, in some embodiments, a frame mount opening 22 may extend through the sunglasses frame mount 21. The frame mount opening 22 may be suitably sized and configured to receive and accommodate the corresponding sunglasses frame arm 52. The frame mount magnet 28 may extend from the sunglasses frame mount 21. Accordingly, the sunglasses frame mount 21 can be placed on the sunglasses frame arm 52 by inserting the end of the sunglasses frame arm 52 through the frame mount opening 22 and sliding the sunglasses frame mount 21 forwardly along the sunglasses frame arm 52 until the sunglasses frame mount 21 is disposed just behind the sunglasses frame 51, as illustrated in FIGS. 3 and 4. In other embodiments, each sunglasses frame mount 21 may be attached or secured to the corresponding sunglasses frame 51 using at least one clip, clamp and/or mechanical fastener (not illustrated) which is suitable for the purpose, for example and without limitation.

Figure 7:
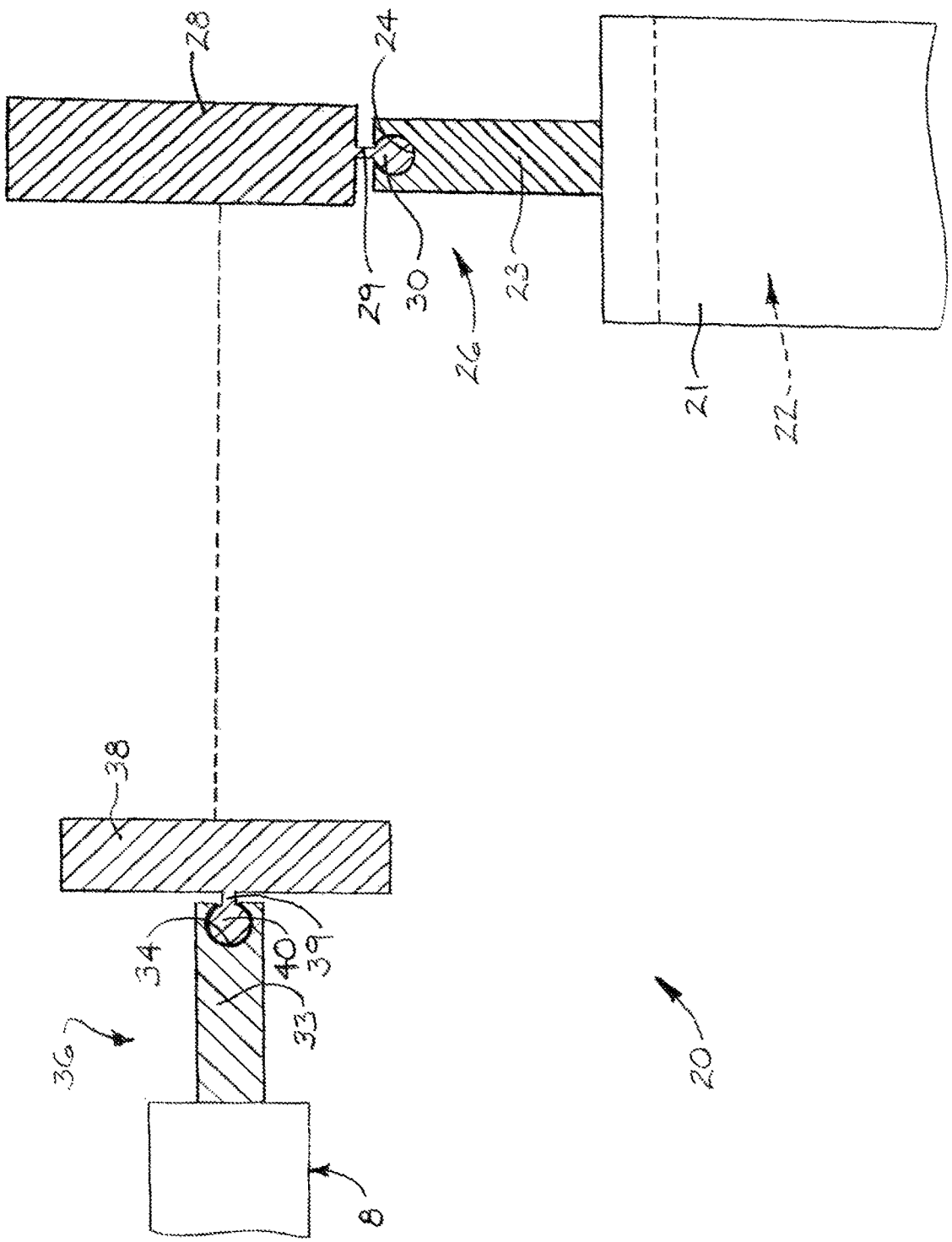
FIG. 7 is an exploded sectional view illustrating a typical screen attachment device suitable for securing the assembly screen of the insect screen assembly to the sunglasses.

In some embodiments, the frame mount magnet 28 may be multi-positional with respect to the sunglasses frame mount 21. Accordingly, as illustrated in FIG. 7, a multi-positional frame mount magnet joint 26 may attach the frame mount magnet 28 to the sunglasses frame mount 21. The multi-positional frame mount magnet joint 26 may include a magnet mount stem 23 which extends from the sunglasses frame mount 21. A ball and socket joint may include a ball socket 24 in the magnet mount stem 23 and a ball 30 inserted in the ball socket 24. The ball 30 may be attached to the frame mount magnet 28 through a ball neck 29. Accordingly, by rotation of the ball 30 in the ball socket 24, the frame mount magnet 28 may be oriented at a desired angle relative to the sunglasses frame mount 21 to facilitate proper alignment or registration and magnetic engagement of the screen magnet 38 with the frame mount magnet 28. As further illustrated in FIG. 7, a multi-positional screen magnet joint 36 may in like manner attach the screen magnet 38 to the assembly screen 8. The screen magnet joint 36 may include a magnet mount stem 33 which extends from the assembly frame 2, or alternatively, the screen panel layer 12 of the assembly screen 8. A ball socket 34 may be provided in the magnet mount stem 33. A ball 40 may be provided in the ball socket 34. The ball 40 may be attached to the screen magnet 38 through a ball neck 39. Accordingly, by rotation of the ball 40 in the ball socket 34, the screen magnet 38 may be oriented at a desired angle relative to the assembly screen 8 to facilitate magnetic engagement of the screen magnet 38 with the frame mount magnet 28.

Figure 8:
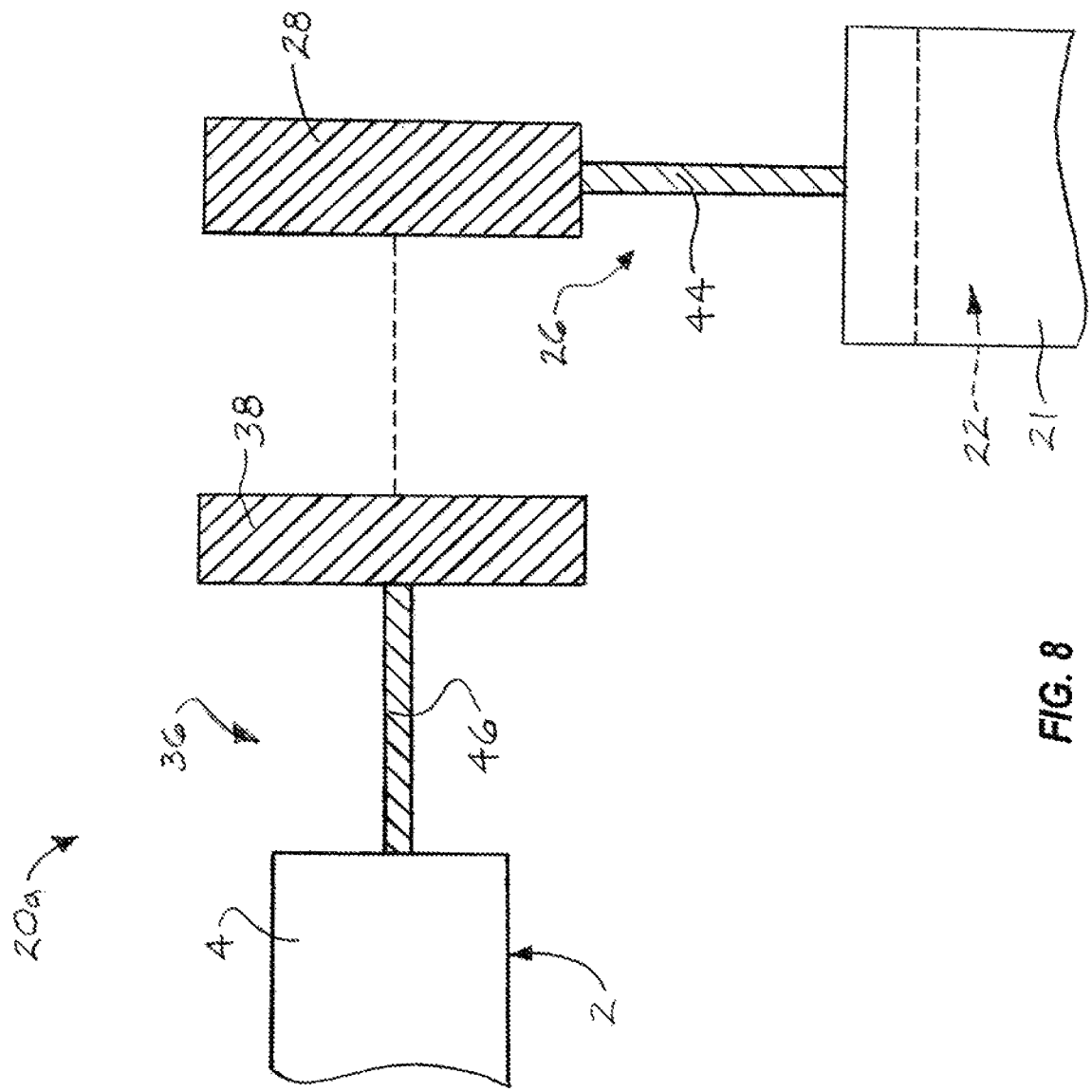
FIG. 8 is an exploded sectional view illustrating an alternative screen attachment device suitable for securing the assembly screen to the sunglasses.

As illustrated in FIG. 8, in some alternative embodiments, the frame mount magnet joint 26 of each screen attachment device 20a may include a magnet mount stem 44 which may include a bendable and pliable wire. Likewise, the screen magnet joint 36 may include a frame magnet stem 46 which may include a bendable and pliable wire. Accordingly, the magnet mount stem 44 can be bended and/or twisted to position the frame mount magnet 28 at a desired orientation, and the frame magnet stem 46 can be likewise bended and/or twisted to position the screen magnet 38 at a desired orientation to facilitate proper alignment and registration for optimal magnetic engagement of the screen magnet 38 with the frame mount magnet 28 in attachment of the assembly screen 8 to the sunglasses 50.

As illustrated in FIGS. 2, 3 and 9, in typical application of the insect screen assembly 1, the assembly screen 8 is attached to the sunglasses 50. Accordingly, the sunglasses frame mounts 21 may be attached to the respective sunglasses frame arms 52 of the sunglasses 50 typically as was heretofore described. The screen magnets 38 may be magnetically engaged with the respective frame mount magnets 28 of the screen attachment devices 20, after which the sunglasses 50 may be donned by the wearer 56 typically in the usual manner. Thus, as illustrated in FIG. 9, the assembly screen 8 is deployed in front of the wearer's face and covers the nose 57, mouth and ears 58 of the wearer 56. As the wearer 56 rides a bicycle, for example, the insect screen assembly 1 may block and prevent flies, insects and airborne particles from entering the nose 57, mouth and ears 58 of the wearer 56.

After use, the screen magnets 38 may be disengaged from the respective frame mount magnets 28, after which the sunglasses frame mounts 21 may be removed from the respective sunglasses frame arms 51 of the sunglasses 50. It will be appreciated by those skilled in the art that the insect screen assembly 1 may require no modification to the sunglasses 50 and serves as an effective way to prevent flies, insects and airborne particles from entering the nose 57, mouth and ears 58 of the wearer 56 during cycling or other outdoor movement.

Figure 16:
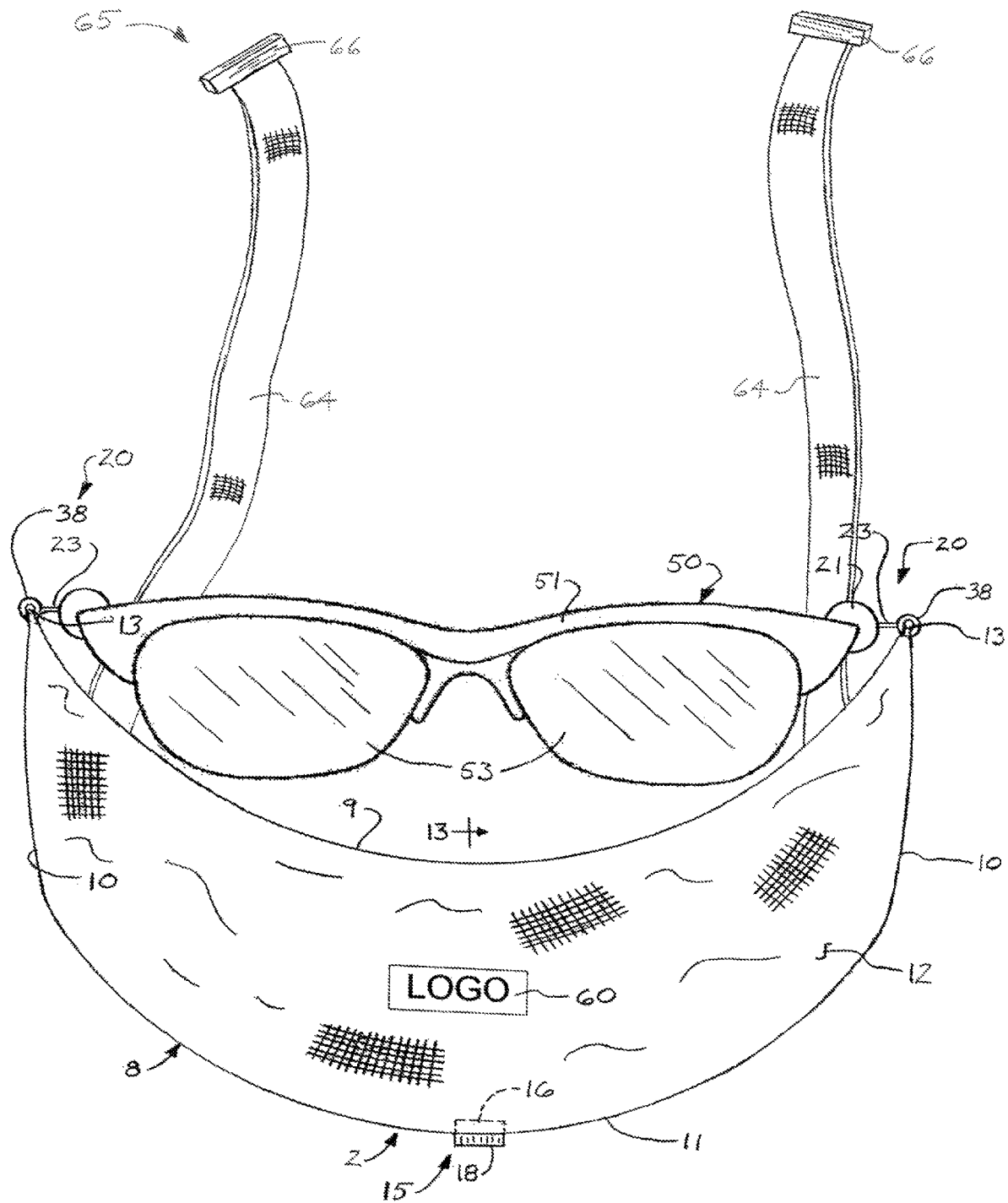
FIG. 16 is a front view of the illustrative insect screen assembly illustrated in FIG. 15, with the panel securing straps unsecured.
Figure 17:
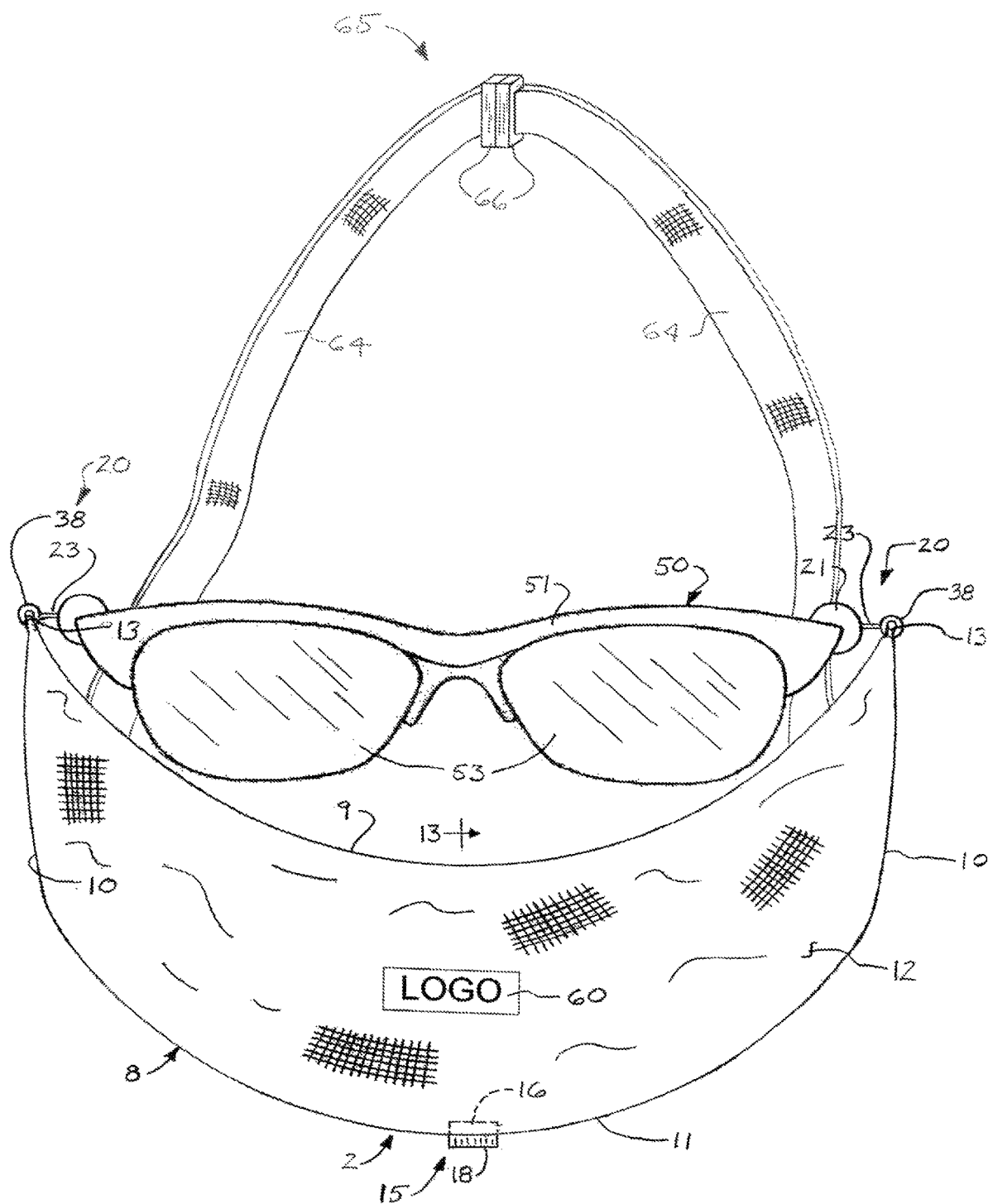
FIG. 17 is a front view of the illustrative insect screen assembly illustrated in FIG. 15, with the panel securing straps secured.
Figure 18:
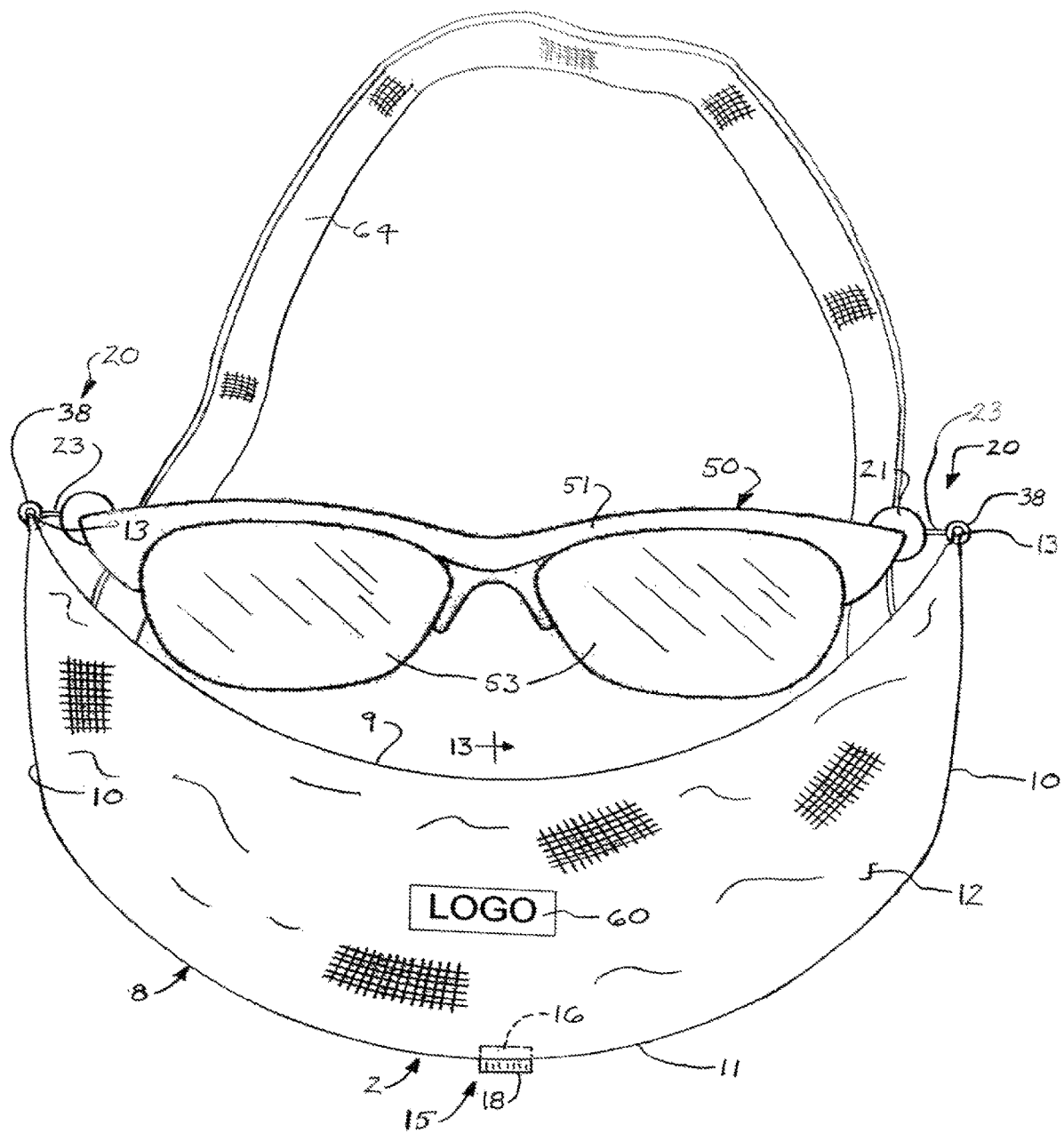
FIG. 18 is a front perspective view of another alternative illustrative embodiment of the insect screen assemblies.

Referring next to FIGS. 15-19 of the drawings, in an alternative illustrative embodiment, the insect screen assemblies 1 may include at least one panel securing strap 64 attached to the assembly screen 8. The at least one panel securing strap 64 may be configurable to extend around the neck (not illustrated) of the wearer 56 (FIG. 9) to place the assembly screen 8 around and in closer proximity to the face of the wearer 56. As illustrated in FIG. 18, in some embodiments, the at least one panel securing strap 64 may include a single panel securing strap 64 the respective ends (not illustrated) of which may be attached to the respective side screen edges 10 or lower screen edge 11 of the assembly screen 8. Accordingly, the panel securing strap 64 may have an elastic construction to facilitate stretching of the panel securing strap 64 as it is deployed in place around the neck of the wearer 56. Upon stretching, the elastic panel securing strap 64 may elongate to fit around the necks of different wearers 56. After it is released, the panel securing strap 64 may recoil to its original length to pull the side screen edges 10 of the assembly screen 8 closer to the ears 58 and face of the wearer 56.

Figure 15:
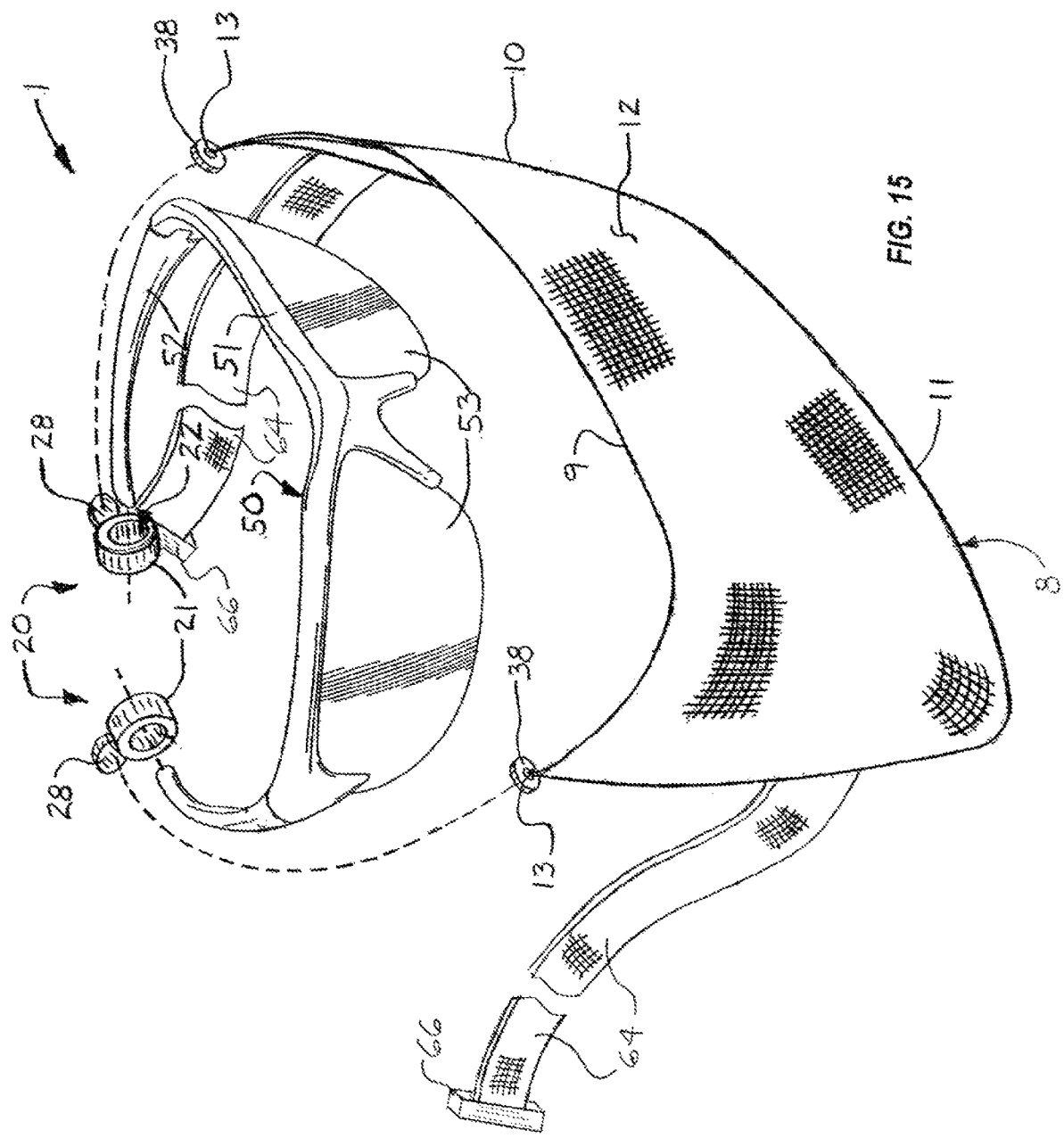
FIG. 15 is an exploded front perspective view of an alternative illustrative embodiment of the insect screen assemblies, more particularly illustrating a typical pair of panel securing straps (partially in section) for detachably securing the insect screen assemblies around the neck (not illustrated) of a wearer.
Figure 19:
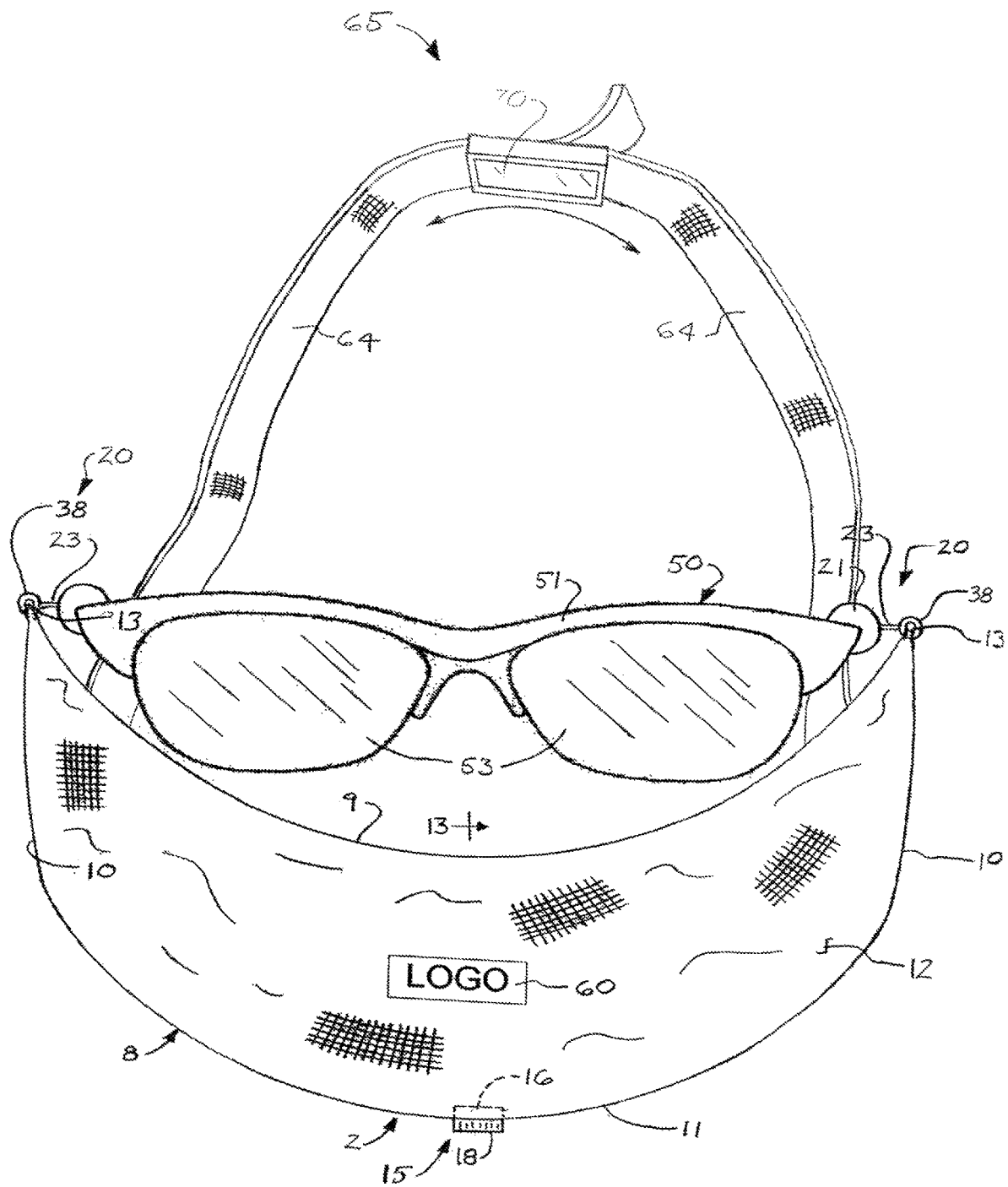
FIG. 19 is a front perspective view of another illustrative embodiment of the insect screen assemblies having a strap securing device which facilitates selective adjustment of the panel securing strap.

As illustrated in FIGS. 15-17, in some embodiments, the at least one panel securing strap 64 may include a pair of panel securing straps 64. Each panel securing strap 64 may be attached to a corresponding side screen edge 10 or the lower screen edge 11 of the assembly screen 8 using stitching and/or other attachment technique known by those skilled in the art. A strap securing device 65 (FIGS. 16 and 17) may be provided on the panel securing straps 64. The strap securing device 65 may have any design which is suitable to releasably fasten the panel securing straps 64 to each other. As illustrated in FIGS. 16 and 17, in some embodiments, the strap securing device 65 may include a pair of strap securing magnets 66 which may terminate respective distal or extending ends of the panel securing straps 64. In other embodiments, the strap securing device 65 may include hook and loop fasteners, snaps, clips, clamps, brackets and/or any other device or mechanism which is suitable to detachably or releasably fasten the panel securing straps 64 to each other. As illustrated in FIG. 19, in still other embodiments, the strap securing device 65 may include an adjustable strap buckle 70 which may be provided in the panel securing strap 64 to facilitate selective adjustment in the length of the panel securing strap 64, according to the knowledge of those skilled in the art. For example and without limitation, in some embodiments, the strap buckle 70 may include a quick disconnect buckle known by those skilled in the art.

Application of the insect screen assemblies 1 may be as was heretofore described with respect to the insect screen assembly 1 in FIG. 9. Accordingly, the single panel securing strap 64 (FIG. 18) may be extended, or alternatively, the paired panel securing straps 64 (FIGS. 15-17 and 19) may be fastened around the neck of the wearer 56 by engagement of the strap securing device 65 to pull the respective side screen edges 10 of the assembly screen 8 toward the ears 58 and against the face of the wearer 56. In some embodiments, the strap buckle 70 (FIG. 19) may be used to selectively adjust the size or length of the panel securing straps 64 according to the preferences of the wearer 56. After use, the panel securing strap 64 may be stretched and pulled over the head of the wearer 56 or the scrap securing device 65 of the panel securing straps 64 released to detach the panel securing straps 64 from each other.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. An insect screen assembly for deployment on the head of a wearer and attachment to sunglasses having sunglasses frame arms, comprising:
   an assembly screen having a plurality of screen openings;
   a pair of spaced-apart screen attachment devices including:
      a pair of screen magnets carried by the assembly screen;
      a pair of sunglasses frame mounts configured for attachment to the sunglasses frame arms, respectively, of the sunglasses; and
      a pair of frame mount magnets carried by the pair of sunglasses frame mounts, respectively, the pair of screen magnets magnetically engage the pair of frame mount magnets, respectively, to detachably secure the assembly screen on the sunglasses; and
   at least one panel securing strap carried by the assembly screen, the at least one panel securing strap extendable around a neck of the wearer.

2. The insect screen assembly of claim 1 further comprising a pair of frame mount openings, respectively, in the pair of frame mounts, respectively, the pair of frame mount openings configured to receive and accommodate the sunglasses frame arms, respectively, of the sunglasses.

3. The insect screen assembly of claim 1 wherein the at least one panel securing strap comprises a pair of panel securing straps and a strap securing device operable to selectively and detachably secure the pair of panel securing straps to each other.

4. The insect screen assembly of claim 1 wherein the at least one panel securing strap comprises a single elastic panel securing strap.

5. The insect screen assembly of claim 1 further comprising a screen weight assembly including at least one screen magnet carried by the assembly screen and at least one magnetic screen weight magnetically attached to the at least one screen magnet.

6. The insect screen assembly of claim 1 wherein the pair of screen attachment devices further comprises a pair of multi-positional frame mount magnet joints connecting the pair of frame mount magnets to the pair of sunglasses frame mounts, respectively.

7. The insect screen assembly of claim 6 wherein the pair of multi-positional frame mount magnet joints comprises a pair of ball and socket joints, respectively.

8. The insect screen assembly of claim 6 wherein the pair of multi-positional frame mount magnet joints comprises a pair of bendable magnet mount stems, respectively.

9. The insect screen assembly of claim 1 wherein the pair of screen attachment devices further comprises a pair of multi-positional screen magnet joints connecting the pair of screen magnets to the assembly screen.

10. The insect screen assembly of claim 9 wherein the pair of multi-positional screen magnet joints comprises a pair of ball and socket joints, respectively.

11. The insect screen assembly of claim 9 wherein the pair of multi-positional screen magnet joints comprises a pair of bendable frame magnet stems, respectively.

12. An insect screen assembly for deployment on the head of a wearer and attachment to sunglasses having sunglasses frame arms, comprising:
   an assembly screen having a pair of side screen edges and a plurality of screen openings;
   a pair of spaced-apart screen attachment devices including:
      a pair of screen magnets carried by the assembly screen;
      a pair of sunglasses frame mounts configured for attachment to the sunglasses frame arms, respectively, of the sunglasses; and
      a pair of frame mount magnets carried by the pair of sunglasses frame mounts, respectively, the pair of screen magnets magnetically engage the pair of frame mount magnets, respectively, to detachably secure the assembly screen on the sunglasses; and
   at least one panel securing strap attached to the pair of side screen edges of the assembly screen, the at least one panel securing strap extendable around a neck of the wearer.

13. The insect screen assembly of claim 12 further comprising a pair of frame mount openings, respectively, in the pair of frame mounts, respectively, the pair of frame mount openings configured to receive and accommodate the sunglasses frame arms, respectively, of the sunglasses.

14. The insect screen assembly of claim 12 wherein the at least one panel securing strap comprises a strap securing device operable to selectively and detachably secure the pair of panel securing straps to each other.

15. The insect screen assembly of claim 14 wherein the strap securing device comprises a strap buckle.

16. The insect screen assembly of claim 12 wherein the at least one panel securing strap comprises a single elastic panel securing strap.

17. The insect screen assembly of claim 12 wherein the pair of screen attachment devices further comprises a pair of multi-positional frame mount magnet joints connecting the pair of frame mount magnets to the pair of sunglasses frame mounts, respectively.

18. The insect screen assembly of claim 17 wherein the pair of multi-positional frame mount magnet joints comprises a pair of ball and socket joints, respectively.

19. Sunglasses with an insect screen assembly, comprising:
    sunglasses including:
        a sunglasses frame;
        a pair of sunglasses frame arms carried by the sunglasses frame; and
        a pair of sunglasses lenses carried by the sunglasses frame;
    an assembly screen having a plurality of screen openings;
    a pair of spaced-apart screen attachment devices including:
        a pair of screen magnets carried by the assembly screen;
        a pair of sunglasses frame mounts configured for attachment to the sunglasses frame arms, respectively, of the sunglasses; and
        a pair of frame mount magnets carried by the pair of sunglasses frame mounts, respectively, the pair of screen magnets magnetically engage the pair of frame mount magnets, respectively, to detachably secure the assembly screen on the sunglasses; and
    at least one panel securing strap carried by the assembly screen, the at least one panel securing strap extendable around a neck of the wearer.

20. The sunglasses of claim 19 wherein the at least one panel securing strap comprises a pair of panel securing straps attached to the assembly screen, and further comprising a strap securing device having a pair of strap securing magnets carried by the pair of panel securing straps, respectively, the strap securing device operable to selectively and detachably secure the pair of panel securing straps to each other.

* * * * *